(12) United States Patent
Kuo

(10) Patent No.: US 9,744,628 B1
(45) Date of Patent: Aug. 29, 2017

(54) SYSTEM AND METHOD FOR COLDWORKING HOLES IN A WORKPIECE

(71) Applicant: Albert S. Kuo, Chesterfield, MO (US)

(72) Inventor: Albert S. Kuo, Chesterfield, MO (US)

( * ) Notice: Subject to any disclaimer, the term of this patent is extended or adjusted under 35 U.S.C. 154(b) by 0 days.

(21) Appl. No.: 15/374,408

(22) Filed: Dec. 9, 2016

Related U.S. Application Data

(63) Continuation of application No. 14/856,749, filed on Sep. 17, 2015, now abandoned.

(51) Int. Cl.
*B23P 9/02* (2006.01)
*B23P 11/02* (2006.01)
*B21D 31/00* (2006.01)
*B21D 39/20* (2006.01)
*B21D 41/02* (2006.01)

(52) U.S. Cl.
CPC .............. *B23P 9/025* (2013.01); *B21D 31/00* (2013.01); *B21D 39/20* (2013.01); *B21D 41/026* (2013.01); *B23P 11/02* (2013.01)

(58) Field of Classification Search
CPC ........ B21D 31/00; B21D 39/00; B21D 39/20; B21D 41/026; B23P 9/025; B23P 11/02
USPC ......................................... 72/370.06–370.08
See application file for complete search history.

(56) References Cited

U.S. PATENT DOCUMENTS

| | | | |
|---|---|---|---|
| 2,405,399 A | 8/1946 | Bugg et al. | |
| 2,854,058 A | 9/1958 | Baker | |
| 3,566,662 A | 3/1971 | Champoux | |
| 3,805,578 A | 4/1974 | King, Jr. | |
| 3,895,922 A | 7/1975 | Phillips | |
| 3,943,748 A | 3/1976 | King, Jr. | |
| 3,951,561 A | 4/1976 | Speakman | |
| 4,164,807 A | 8/1979 | King, Jr. | |
| 4,203,313 A * | 5/1980 | Kunzli | B21D 39/20 72/364 |
| 4,423,619 A | 1/1984 | Champoux | |

(Continued)

OTHER PUBLICATIONS

Rodman, G. A. et al., "Split Mandrel VS. Split Sleeve Coldworking: Dual Methods for Extending the Fatigue Life of Metal Structures", FAA/NASA International Symposium on Advance Structural Integrity Methods for Airframe Durability and Damage Tolerance, NASA Conference Publication 3274, Part 2, Sep. 1994, pp. 1077-1086.

(Continued)

*Primary Examiner* — Teresa M Ekiert
*Assistant Examiner* — Gregory Swiatocha
(74) *Attorney, Agent, or Firm* — CreatiVenture Law, LLC; Dennis J M Donahue, III

(57) ABSTRACT

Systems and methods for coldworking metal are described that reduce the axial flow of metal and increase the radial/tangential flow, thereby improving the fatigue life at an aperture. A tool is inserted through an aperture and its travel speed is reduced when in contact with the metal to reduce axial plastic flow. A sensor as part of the motive system moving the mandrel can sense when the tool contacts the metal and reduces the speed of the tool. The tool may move more quickly when not in contact with the metal to reduce working time than when the mandrel is working the metal. The coldworking tool engages the metal at the aperture at a speed of less than the speed which results in the time duration for the mandrel engaging the metal at the aperture for 35 second per inch of metal thickness at the aperture.

15 Claims, 9 Drawing Sheets

(56) References Cited

U.S. PATENT DOCUMENTS

| | | | |
|---|---|---|---|
| 4,433,567 A | 2/1984 | Mead | |
| 4,597,282 A | 7/1986 | Hogenhout | |
| 4,665,732 A | 5/1987 | Hogenhout | |
| 4,956,991 A | 9/1990 | Noonan | |
| 5,127,254 A | 7/1992 | Copple et al. | |
| 5,297,409 A | 3/1994 | Beaman et al. | |
| 5,479,829 A * | 1/1996 | Levy | G01B 21/32 29/705 |
| 5,613,395 A | 3/1997 | Zienkiewicz et al. | |
| 5,829,292 A | 11/1998 | Andriessen | |
| 5,943,898 A | 8/1999 | Kuo | |
| 6,230,537 B1 | 5/2001 | Easterbrook | |
| 6,266,991 B1 | 7/2001 | Kuo | |
| 7,302,746 B2 | 12/2007 | Kuo | |
| 2006/0112533 A1* | 6/2006 | Kuo | B23P 9/025 29/446 |
| 2006/0243018 A1 | 11/2006 | Krauss | |
| 2007/0289351 A1* | 12/2007 | Glenn | B23P 9/025 72/370.07 |
| 2012/0090373 A1 | 4/2012 | Clark et al. | |
| 2013/0204422 A1 | 8/2013 | Ross et al. | |
| 2014/0182874 A1* | 7/2014 | Barezzani | B25B 27/10 173/217 |
| 2015/0165507 A1 | 6/2015 | Reese | |
| 2015/0174708 A1 | 6/2015 | Maksimov et al. | |

OTHER PUBLICATIONS

Wayman, C. M., "Shape Memory Alloys", Materials Research Society, MRS Bulletin, Apr. 1993, pp. 49-56, vol. 18, No. 4.

* cited by examiner

Data points for split sleeve and split mandrel are taken from NASA Conference Publication 3274 Part 2, 1994, Pages 1077-1086

Data points for split sleeve and split mandrel are taken from NASA Conference
Publication 3274 Part 2, 1994, Pages 1077-1086

SYSTEM AND METHOD FOR COLDWORKING HOLES IN A WORKPIECE

CROSS-REFERENCE TO RELATED APPLICATIONS

The present application is a continuation of U.S. patent application Ser. No. 14/856,749, filed Sep. 17, 2015, titled SYSTEM AND METHOD FOR COLDWORKING HOLES IN A WORKPIECE, which is hereby incorporated by reference.

TECHNICAL FIELD

This disclosure relates to systems and methods for coldworking apertures in a metal, and, more specifically, to coldworking holes in aircraft parts.

BACKGROUND

U.S. Pat. No. 3,566,662 describes disposable sleeves for coldworking of holes. The apparatus uses a tapered oversized plug element with a thereon positioned thin-walled split sleeve. The plug element is inserted with the sleeve into a hole. When the plug element is pulled back through the hole, the sleeve is kept in the hole by the apparatus so that radially outwards directed forces are exerted by the plug on the sleeve, which in turn transmits the coldworking forces to the wall of the hole. After the plug is pulled out of the hole, the sleeve is removed from the hole and discarded.

U.S. Pat. No. 4,566,662 describes coldworking of holes using a split mandrel. The apparatus uses a mandrel having radially directed slots to permit contraction of its outer diameter as it is fitted within a hole. The mandrel contains a pilot inside the mandrel. After placing the mandrel and pilot within a hole to be coldworked, the pilot is pushed into the mandrel expanding the mandrel. The pilot and mandrel are then withdrawn through the hole, thereby coldworking the hole.

U.S. Pat. No. 5,943,898 describes coldworking holes using a pre-lubricated tubular seamless sleeve made of shape memory alloys. The apparatus uses a pre-lubricated tubular seamless sleeve made of shape memory alloys, a mandrel having a larger diameter end, a nose cap with rough conical surface, and a spacer with rough complementary conical surface. The mandrel retracts backwardly through and out of the sleeve; thereby expanding the sleeve wall against the hole wall and exerts radially outward forces on the sleeve. Which in turn transmits the coldworking forces to the hole wall. After the mandrel is pulled out of the hole, the sleeve diameter restores to its original diameter because of the superelastic property of shape memory alloys, and therefore it can be easily removed out of the hole.

These coldworking methods and systems result in substantial axial plastic flow of metal to the mandrel-exit side of a metal sheet.

SUMMARY

Systems and methods for reducing plastic flow of metal in the axial direction of an aperture while increasing non-axial plastic flow are described herein. In an example, a method for coldworking metal includes moving a mandrel to a position to engage through an aperture in a metal for coldworking, moving the mandrel through the aperture to coldwork the metal at the aperture at a first speed; upon the mandrel engaging the metal to coldwork the metal at the aperture, moving the mandrel at a second speed such that the mandrel engaging the material at the aperture for greater than 10+/−2 seconds per inch of thickness of the metal. In an example, the mandrel second speed, when engaged with the metal, is slower than the first speed. In an example, the first speed is limited to when the mandrel is not coldworking the metal, for example, the mandrel is free from the metal at the first speed and engaged to the metal at the second speed. In other example embodiments, the speed of the mandrel coldworking the metal at the hole is controlled to a sufficiently slow speed to promote non-axial plastic flow and reduce axial plastic flow.

In an example embodiment, moving the mandrel through the aperture to coldwork at the second speed includes sensing a pressure increase imparted by the metal to the mandrel to indicate an increase in force to the mandrel to maintain mandrel retraction speed change from the first speed to the second speed or hold the mandrel at the second speed.

In an example embodiment, moving the mandrel through the aperture to coldwork at the second speed includes operating a hydraulic press configured to axially move the mandrel through the aperture in the metal and retract the mandrel back through the aperture at the second speed.

In an example embodiment, operating a hydraulic press includes operating the mandrel at sufficiently slow speed to promote non-axial (radial and tangential) material plastic flow at the aperture and to retard axial flow of the metal at the aperture, therefore enhancing the creation of the beneficial compressive residual stress at the aperture, thereby improving the effectiveness of coldworking operation.

In an example embodiment, retracting the mandrel includes retracting the mandrel at the second speed such that the mandrel engaging the metal at the aperture for greater than 35+/−5 seconds per inch of metal thickness at the aperture.

In an example embodiment, retracting the mandrel includes retracting the mandrel at the second speed such that the mandrel engaging the metal at the aperture for greater than 350+/−10 seconds per inch of metal thickness at the aperture.

In an example embodiment, inserting the mandrel includes advancing the mandrel at a first speed to a position in a hydraulic press suitable for inserting the mandrel into the aperture without coldworking the aperture; subsequently retracting the mandrel initially at same first speed then at a second speed that is slower than the first speed upon the mandrel engaging the metal at the aperture.

In an example embodiment, inserting the mandrel includes inserting a mandrel with a sleeve through the aperture. The sleeve is configured to engage the metal at the aperture.

In an example embodiment, retracting the mandrel includes retracting the mandrel at a second speed such that the mandrel engaging the metal at the aperture for greater than about 60+/−5 seconds per inch of metal thickness at the aperture.

In an example embodiment, retracting the mandrel includes retracting the mandrel at a second speed such that the mandrel engaging the metal at the aperture of ¼ inch diameter in ¼ inch thick aluminum for greater than about 15 seconds while coldworking the metal at the aperture.

In an example embodiment, retracting the mandrel includes rotating the mandrel when the mandrel or a sleeve on the mandrel is coldworking the metal.

A system for coldworking metal at an aperture in a workpiece can perform the above method steps.

A system for coldworking metal includes a coldworking mandrel configured to engage a workpiece at an aperture thereof; a motive device configured to move the mandrel into engagement with the aperture in the workpiece and configured to engage the mandrel to the workpiece at a speed such that the mandrel engaging the metal at the aperture bore for greater than 35+/−5 second per inch of coldworked hole thickness so as to reduce workpiece material plastic flow in axial direction and to increase workpiece material plastic flow in a non-axial (radial and tangential) direction therefore enhancing the creation of the beneficial compressive residual stress at the aperture, thereby improving the effectiveness of coldworking operation.

In an example embodiment, the motive device moves the mandrel into engagement with the workpiece at a first speed and engages the mandrel to the workpiece at the aperture at a second speed which is slower than the first speed.

In an example embodiment, the motive device includes a hydraulic cylinder and a hydraulic system configured to control the hydraulic cylinder to retract the mandrel at a speed such that the mandrel engaging the metal at the aperture bore for greater than 35+/−5 second per inch of coldworked hole thickness.

In an example embodiment, the motive system includes a first flow path to move the mandrel at a speed greater than the speed which makes the mandrel engaging the metal at the aperture bore for 35+/−5 second per inch and a second flow path to move the mandrel at a speed less than the speed which makes the mandrel engaging the metal at the aperture bore for 35+/−5 second per inch.

A method to maintain approximately a same coldworking interference level by compensating for the diameter variation of coldworking start hole due to a manufacturing tolerance of hole diameter may include selecting a wall thickness for the sleeve to be used for start aperture diameters within the manufacturing tolerance, measuring diameter of start aperture, and determining a mandrel major diameter to maintain approximately a same coldworking interference level for the measured diameter of said start aperture and the selected wall thickness of the sleeve.

In an example embodiment, determining includes determining using a processor with the measured diameter of the start aperture and the selected wall thickness as inputs to the processor.

In an example embodiment, the processor is incorporated into a computer system to control steps of coldworking holes including drill under-sized pilot hole, reaming hole to specified coldworking start hole size, inspecting start hole size, selecting mandrel of required size to maintain approximately constant coldworking interference level, inspect size of selected mandrel, performing coldworking operation, inspect size of coldworked hole, reaming coldworked hole to specified size.

A method for coldworking metal including inserting a sleeve in an aperture in a metal, moving a mandrel to the sleeve at a first speed, and upon the mandrel engaging the sleeve to coldwork the metal at the aperture, advancing the mandrel at a second speed, wherein the second speed is slower than the first speed to reduce axial plastic flow and increase non-axial (radial and tangential) plastic flow at the aperture, therefore enhancing the creation of the beneficial compressive residual stress at the aperture, thereby improving the effectiveness of coldworking operation.

In an example embodiment, moving the mandrel includes advancing the mandrel at the second speed such that the mandrel engages the sleeve at the aperture of ¼ inch diameter in ¼ inch thick aluminum for greater than about 15 seconds while coldworking the metal at the aperture.

In an example embodiment, inserting the sleeve includes inserting a seamless sleeve.

A system for coldworking metal includes a coldworking mandrel configured to engage a workpiece at an aperture thereof; a motive device to move the mandrel into engagement with the aperture of the workpiece and to engage the mandrel to the workpiece at a speed such that the time duration for the mandrel engaging the metal at the aperture bore is greater than 35+/−5 second per inch of metal thickness at the aperture so as to cause workpiece material flow in the non-axial (radial and tangential) direction, therefore enhancing the creation of the beneficial compressive residual stress at the aperture, thereby improving the effectiveness of coldworking operation.

In an example embodiment, the motive device includes a hydraulic cylinder and a hydraulic system configured to control the hydraulic cylinder to move the mandrel at a speed such that the time duration for the mandrel engaging the metal at the aperture bore for coldworking is greater than 60+/−5 seconds per inch.

Systems and methods for coldworking metals include engaging a mandrel to coldwork a workpiece at a speed such that the time duration for the mandrel engaging the metal at the aperture bore for coldworking is 15, 35, 60 or 350 seconds per inch or greater according to example embodiments. A motive device may control the movement of the mandrel at the desired speed and may control the mandrel to move at multiple speeds.

In an example embodiment, a method for coldworking metal includes inserting a mandrel through an aperture in a metal, retracting the mandrel at a first speed, and upon the mandrel engaging the metal to coldwork the metal at the aperture, retracting the mandrel at a second speed, wherein the second speed is slower than the first speed.

In an example embodiment, retracting the mandrel at a second speed includes sensing a pressure increase imparted by the metal to the mandrel to indicate a change from the first speed to the second speed.

In an example embodiment, retracting the mandrel at a second speed includes operating a hydraulic press configured to axially move the mandrel at both the first speed and the second speed.

In an example embodiment, operating a hydraulic press at the second speed to promote non-axial (radial and tangential) plastic flow of metal at the aperture and to retard axial plastic flow of the metal at the aperture, therefore enhancing the creation of the beneficial compressive residual stress at the aperture, thereby improving the effectiveness of coldworking operation.

In an example embodiment, retracting the mandrel includes retracting the mandrel at the second speed such that the mandrel engaging the material at the aperture for greater than 10+/−2 seconds per inch of metal thickness at the aperture.

In an example embodiment, inserting the sleeve includes inserting a seamless sleeve.

A system for coldworking metal may include a coldworking mandrel configured to engage a workpiece at an aperture thereof and a motive device to move the mandrel into engagement with the aperture of the workpiece and to engage the mandrel to the workpiece at a speed such that the mandrel engaging the metal at the aperture for greater than 60+/−5 seconds per inch so as to promote workpiece material plastic flow in the non-axial (radial and tangential) direction and retard material plastic flow in the axial direction, therefore enhancing the creation of the beneficial compressive residual stress at the aperture, thereby improving the effectiveness of coldworking operation.

In an example embodiment, the motive device includes a hydraulic cylinder and a hydraulic system configured to control the hydraulic cylinder to move the mandrel at a speed such that the mandrel engaging the metal at the aperture for greater than 60+/−5 second per inch or greater when the mandrel is engaged with the workpiece.

It will be appreciated that any of the above methods may be performed by the vehicle described herein.

DETAILED DESCRIPTION

Figure 1B:
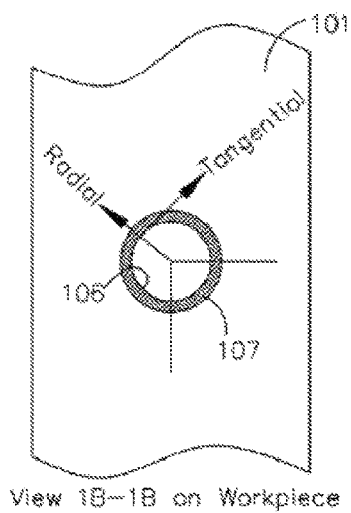
FIG. 1B shows an elevation a view of a workpiece with an aperture that was coldworked taken generally along line 1B-1B of FIG. 1A according an example embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure describes controlling the speed of a tool, e.g., a mandrel, engaging metal to be coldworked. The speed of the tool is controlled to reduce axial plastic flow of metal while increasing the non-axial (radial and tangential) plastic flow of metal at the work site, e.g., an aperture (i.e., a hole). A hydraulic controller can control the speed of the tool such that the speed can be greater when not coldworking the metal and less when coldworking the metal.

The present disclosure also describes using a plurality of speeds when operating a tool to engage a workpiece. The tool can be a coldworking tool to engage a metal, e.g., to expand an aperture in the metal by plastic flow of metal at the aperture. The use of multiple travel speeds allows the device to efficiently produce coldworked workpieces and still impart improved structural characteristics. The tool can engage travel to the workpiece and be at a position to begin coldworking the workpiece at a first speed. The tool will engage and perform the coldworking at a second speed, which is slower than the first speed. Additional steps in speed are also within the scope of the present disclosure. In an example, the second speed at which the metal is coldworked is such that the time duration for mandrel engaging the metal at the aperture to coldwork the aperture is equal to or greater than 10+/−2 seconds per inch, 15+/−2 seconds per inch, 35+/−5 seconds per inch, 60+/−5 seconds per inch, 350+/−10 seconds per inch, +/−up to 500+/−10 seconds per inch or greater. Other acceptable values for the speed may be the above values. Other speeds may be 10, 15, 35, 60, 350, 500 seconds per inch of material or these speeds +/−5% or 10%. For the speeds of greater than 35 seconds per inch of material the speeds may vary about 20% in some embodiments.

The coldworking of workpieces may use sleeves (either split or seamless shape memory) for coldworking of holes as a means of extending the fatigue life of workpieces, e.g., metal structures. In search of lower manufacturing costs with high quality results, the aerospace industry (and other manufacturing industries) has examining the split mandrel (sleeveless) coldworking process as an alternative method of coldworking fastener holes in metal structures. The split mandrel process significantly extends the fatigue life of metal structures through the introduction of a residual compressive stress in a manner that is very similar to the split sleeve system. Since the split mandrel process may be less expensive than the split sleeve process and more adaptable to robotic automation, it has found some adoption in industry. The use of sleeves may be versatile and controllable, e.g., with a mandrel, as described herein.

Figure 1A:
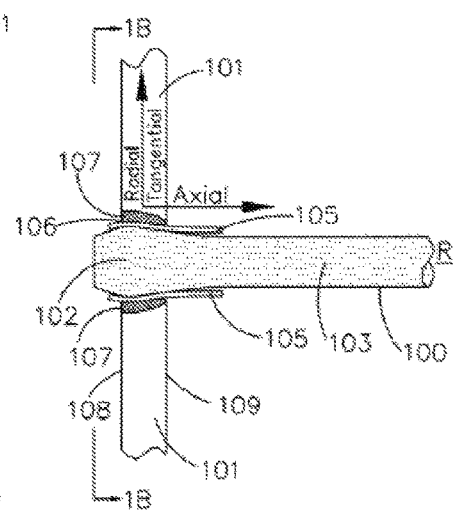
FIG. 1A shows a mandrel coldworking a workpiece according to an example embodiment.

FIG. 1A shows a tool 100 and a workpiece 101 with the tool 100 engaging the workpiece 101. The tool 100 may be a mandrel in an example. The mandrel 100 has a major diameter portion 102 which tapers to the minor diameter portion 103. The mandrel 100 is forced through the aperture 106 to coldwork the material forming the aperture 106, e.g., by forcing the major diameter portion 102 through the aperture 106. More specifically, mandrel 100 is retracted during a coldworking operation, with the mandrel 100 traveling in the axial direction, which is along the length of the mandrel and is also the out-of-plane axis of the aperture, to the position such that the combined diameter of major diameter portion 102 and the thickness of sleeve 105 being larger than the diameter of the aperture 106 in a workpiece 101. The material at hole bore and its vicinity begin to be forced outwardly from the space in the aperture, e.g., expanded in the radial and tangential direction of the aperture at a force greater than the yield strength of the material of the workpiece 101. This situation is referred to as "mandrel engages with hole bore" herein for brevity. When the radial expansion progresses with the major diameter portion of mandrel (and sleeve if present) travels deeper into the hole bore, the annular region 107, as seen in the view from mandrel-entrance side 108 of the workpiece 101 of plastically yielded material immediately surrounding the aperture 106 expands outward in the radial and tangential direction taken from the center axis of the aperture.

FIG. 1A illustrates a moment where major diameter portion 102 of mandrel 100 reaches the mandrel exit side 109 of the workpiece 101 to cause plastic yielding of the material throughout the entire thickness of material defining the aperture. The diameter of the aperture from the mandrel-entrance side 108 to the mandrel-exit side 109 progressively decreases. The region of plastically yielded material 107 is annularly-conical shape in the three-dimension space. The region of plastically yielded material 107 is in a state of fluidity; as such, the material within said region can flow not only in the radial and tangential direction (e.g., desired direction) but also axial direction of the aperture when the region 107 is subjected to certain inducement in axial direction, which may be dependent on the axial speed of the travelling mandrel 100. When retraction progresses and the mandrel 100 travels to a position such that the combined diameter of major diameter portion 102 and the thickness of sleeve 105 is lesser than the diameter of the aperture 106 in the workpiece 101, the material at hole bore no longer has interaction with mandrel and/or sleeve. This situation is referred to as "mandrel disengages with hole bore" herein for brevity. After the mandrel 100 travels through and out of the aperture 106, the workpiece 101 shows visible protrusions 110 around aperture edge on the mandrel-exit side 109 of the aperture 106 and additional visible protrusions 110 around aperture edge on the mandrel-entrance side 108 of the aperture 106. The protrusions 110 shown are exaggerated for the clarity of illustration. The difference in the extent of protrusions on the two sides of the aperture can be attributed to the relevant retraction speed, which is the speed during the "relevant retraction time" defined as the time duration from the moment that "mandrel engages with hole bore" to the moment that "mandrel disengages with hole bore". If there were no relevant retraction speed, the dimensions of the protrusions on both sides of the hole would be approximately the same due to the Poisson expansion in axial direction which is induced by the radial expansion forced by the mandrel 100. The relevant retraction speed induces axial plastic flow in the direction from mandrel-entrance side 108 to mandrel-exit side 109. For example, a greater amount of material of the plastically yielded material is carried away to, or flows toward the mandrel-exit side 109. As a result, the beneficial compressive stress near the mandrel-entrance side 108 is less than that near mandrel-exit side 109. Clearly, for the fatigue behavior, the weak point along the aperture bore is on the mandrel-entrance side 108 because it has less beneficial compressive residual stress. This explains the reason for the commonly observed crack origins to be on the mandrel-entrance side 108 of the aperture bore. For example, the conventional methods described above may result in such cracks or non-optimal fatigue behavior. High relevant retraction speed of the mandrel 100 will give rise to large axial plastic flow, which reduces the amount of radial and tangential plastic flow and, hence, less material in a plastic state at the mandrel-entrance side 108.

Furthermore, when the plastically yielded material in "thin" workpiece moves at high relevant retraction speed such as those of prior art methods, the workpiece tends to bulge, (e.g., deflect convexly) away from the hydraulic press housing the mandrel. Here "thin" may means that the thickness of workpiece is considerably less than the aperture diameter, e.g., 0.7, 0.5, 0.3 or less than the diameter or cross sectional dimension of the aperture. This explains why the coldworking operation of prior art methods requires a backup block (e.g., an anvil) on the mandrel-entrance side to prevent thin workpiece from bulging away during coldworking. Although mandrel retraction axial speed is undesirable, it is inherent to those art methods which employ a mandrel. However, in the present disclosure relevant retraction speed can be made sufficiently low to improve the effectiveness of coldworking operation, yet not too low to prolong total coldworking operation time.

FIG. 1B shows an elevational view of the workpiece 101 that is being coldworked according to a method or system as described herein. The FIG. 1B view is taken generally along line 1B-1B of FIG. 1A. An aperture 106 is formed in the workpiece 101 with the mandrel 100 being positioned in the aperture 106. The mandrel 100 is drawn into the paper away from the plane shown to flow the workpiece material in the radial and tangential direction. The speed of the mandrel 100 is adjusted from its initial speed to move more slowly when engaging the workpiece material to cause a greater non-axial (radial and tangential) flow and decrease the material flow in the axial direction. In an example embodiment, the speed at which the mandrel is engaged with the material to force a plastic flow is such as to resulting in an "unit relevant retraction time (URRT)" of 10+/−2 second per inch or greater, where "unit relevant retraction time" is defined as the aforementioned relevant retraction time being divided by the material thickness at the aperture. Other speeds are within the scope of the present disclosure including, but not limited to, speeds resulting in an URRT up to 700 seconds per inch. For example, speeds resulting in an URRT of 15+/−2 seconds per inch, 35+/−5 seconds per inch, 60+/−5 seconds per inch, 350+/−5 seconds per inch, and/or 500+/−10 seconds per inch.

Figure 1C:
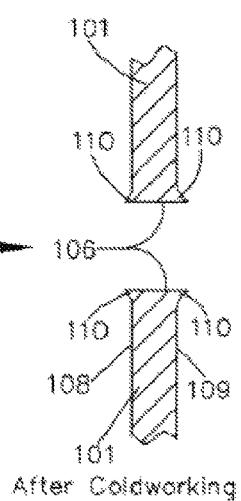
FIG. 1C shows a cross sectional view of a workpiece after coldworking according to an example embodiment.

FIG. 1C shows a cross sectional view of a workpiece 101 that has been coldworked according to a method or system as described herein. At the inner surface of the workpiece 101 that forms the aperture 106, there are protuberances 110 of material that extend beyond the outer and inner surfaces of the workpiece. The workpiece 101 may be a metal sheet that has a planar outer surface and a planar inner surface at least adjacent the aperture 106. For example, the workpiece 101 may be a metal sheet. These protuberances 110 are formed by the mandrel when it engages the workpiece. It is desired to even the size of these protuberances to force more workpiece material to flow in the non-axial (radial and tangential) direction to improve the performance characteristics of the material at the aperture. In an example, a tool will cause the radial flow of material to force material into other material of the material sheet and keep as much material as possible within the plane of the sheet of material. The material flow may be a plastic flow but the present tool will limit the plastic flow from moving out of the plane of the workpiece. In some instances the tool will reduce the amount of metal that flows in the axial direction (i.e., out-of-plane direction) toward the mandrel-exit side of the metal sheet being worked by a tool, e.g., by controlling the speed of the tool working the material.

Figure 1D:
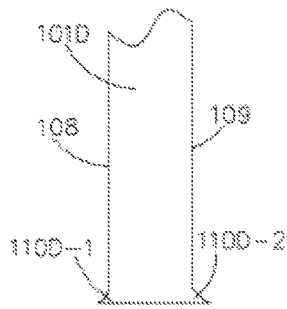
FIG. 1D shows an enlarged view of part of the material at the aperture of a workpiece after coldworking according to an example embodiment.

FIG. 1D shows a partial view of an aperture 106 that was coldworked according to the present methods. The workpiece 101D includes a mandrel-entrance side protrusion 110D-1 and a mandrel-exit side protrusion 110D-2. The difference between protrusions 110D-1 and 110D-2 is smaller than that between the protrusions 110E-1 and 110E-2 of FIG. 1E, which schematically shows protrusion created by a conventional process that does not intentionally reduce the mandrel axial speed as it is engaging the material of the workpiece to create plastic flow in the radial and tangential direction.

Figure 1E:
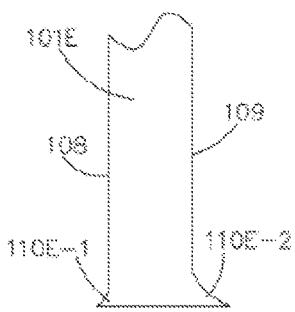
FIG. 1E shows an enlarged view of part of the material at the aperture of a workpiece after coldworking according to a convention coldworking process.

FIG. 1E shows a partial view of an aperture 106 of a workpiece 101E that is coldworked by a conventional process. The plastically yielded material of the workpiece flows in the axial direction a greater distance than using the multiple speed mandrel process as described herein. That is, the mandrel travels slower while engaging the material in the presently described embodiments relative to the prior art methods.

The present disclosure further provides a hydraulic system 200, 300 to provide the methods described herein, for example, "sufficiently low axial speed of mandrel retraction", for improving the effectiveness and consistency of coldworking operation. Mandrel speed decreases with decreasing flow rate of hydraulic power unit of the systems 200, 300. The flow rates of some small hydraulic power units with at least two speeds are around 10 cubic inch per minute are too large to fulfill the aforementioned sufficiently low mandrel retraction axial speed. One way to handle the problem is to build a custom-made two-speed hydraulic power unit with sufficiently low flow rate. Another way is to perform the present embodiments with sufficiently low flow rates by utilizing a combination of currently available power unit and flow control valves.

Figure 2:
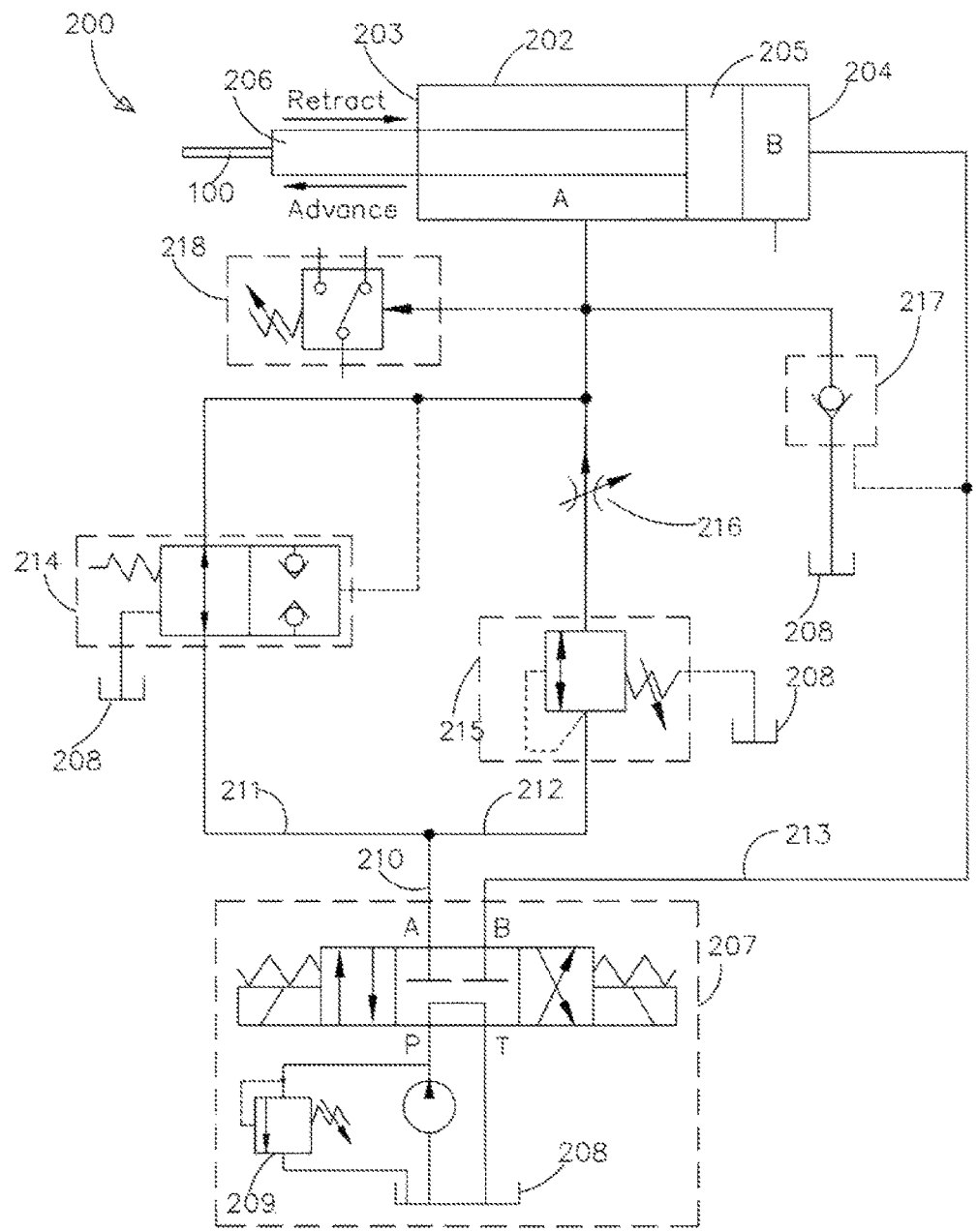
FIG. 2 is a schematic view of a system for coldworking a workpiece according to an example embodiment.

In an example adding a flow rate control valve to the hydraulic power unit will make the entire retraction period too long to be practical processing technique for modern manufacturing albeit serving the purpose of sufficiently low mandrel speed. Only the retraction speed in the relevant retraction time needs to be slowed. In this disclosure, a hydraulic circuit to enable a first, high retraction speed for outside the relevant retraction time and a second, sufficiently low speed for within said time is disclosed. A motive device, e.g., a hydraulic cylinder, a hydraulic system driven by an air motor or an electric motor, may control the movement of the mandrel during its engagement with the material at the aperture. Referring to FIG. 2, a hydraulic system 200 is shown that can perform the presently described methods. The hydraulic system 200 includes a double acting hydraulic cylinder 202 which may be carried on a handle (not shown) or fixed to a substrate to facilitate coldworking operation. The hydraulic cylinder 202 has a rod end 203 and a head end 204. A piston rod 206, to which coldworking mandrel 100 is connected, extends out through rod end 203 and is connected to a piston 205 which divides the hydraulic cylinder 202 into chamber A to energize mandrel retraction and chamber B to energize mandrel advance. The hydraulic system 200 also includes a double acting hydraulic power unit 207 which has a three-position solenoid valve to enable the remote control of advance, hold, and retract of the piston rod 206 (and hence the mandrel 100), and which has two speeds to provide high and low flow rates. The hydraulic power unit 207 has a reservoir tank 208 and two ports, designated as port A and B, for delivering pressurized hydraulic fluid to cylinder 202 and returning the hydraulic fluid (e.g., oil) from the cylinder 202 to the tank 208. The hydraulic system 200 further includes a) fluid logic device 214 to close a flow path when pilot pressure rising to a preset value and to re-open same flow path when pilot pressure falling to a value characteristic to the device, commonly known as normally-open logic element, b) a flow controller 215 to open a flow path at a preset pressure, commonly known as normally-closed sequence valve, c) a flow controller 216 to control flow rate, commonly known as flow rate control valve, preferably being a pressure-compensated one to assure the constant flow rate at varying pressure during coldworking operation, d) a flow valve device 217 to open a flow path when pilot pressure reaching preset value, commonly known as pilot-to-open check valve, and e) a switch 218 to switch an electrical device such as LED light when pressure reaching a preset value, commonly known as pressure switch. The function of the pressure compensated flow controller 216 is to maintain constant flow rate into chamber A of cylinder 202 during mandrel retraction to deal with the varying hydraulic fluid pressure caused by the progressing engagement of mandrel with aperture bore, the variation of friction between mandrel and aperture bore, and the capability of the hydraulic power unit 207 to produce fairly constant flow rate.

At the start of mandrel retraction to coldwork an aperture in a workpiece, the hydraulic fluid coming out of port A of power unit 207 flows via flow path 210 and 211 through hydraulic logic element 214 to quickly retract the mandrel to engage with the aperture bore at high flow rate of power unit 207, while flow path 212 is being blocked by flow controller (e.g., sequence valve) 215. As mandrel retraction continues, the mandrel 100 engages more with aperture bore such that higher hydraulic fluid pressure is required to continue mandrel retraction; the low flow rate at high pressure feature of power unit 207 kicks in to provide the required high pressure hydraulic fluid flow. When hydraulic fluid pressure rises to a preset value, for example, 400+/−25 psi, logic element 214 will be blocked for flow path 211. Shortly thereafter when hydraulic fluid pressure exceed a preset value for fluid controller (e.g., a sequence valve or manifold) 215, which is slightly higher than that for fluid logic device 214, for example, 500+/−25 psi, fluid controller 215 opens to allow flow of pressure higher than 500+/−25 psi, through flow rate controller 216, into chamber A of cylinder 202 at low flow rate to enable sufficiently low speed of mandrel retraction. When the engagement between the mandrel 100 and the aperture bore (e.g. workpiece material defining the aperture 100) reaches maximum during mandrel retraction, hydraulic fluid pressure in chamber A of cylinder 202 also reaches maximum which stays for a while, thereafter the engagement of the mandrel to the workpiece at the aperture starts to decrease, so does hydraulic fluid pressure. Before the hydraulic fluid pressure in chamber A of cylinder 202 falls to a value characteristic to logic element 214, for example 200+/−25 psi, to make it re-open, the logic element 214 remains blocked. The flow rate of flow controller 216 is set to be much smaller than the flow rate of power unit 207; thus, once fluid controller 215 is open, the constriction of flow rate from port A of power unit 207 will force the power unit to run at the limit pressure set by its pressure relief valve 209. Thus, logic device 214 still will be closed and fluid controller 215 still will be open to enable sufficiently low mandrel retraction speed.

After the piston rod 206 retracts the mandrel 100 out of aperture bore to finish the most important step of coldworking operation, an operator may feel a jerk from the handle (not shown in FIG. 2) of cylinder 202, therefore be signaled to stop mandrel retraction. However, if operator does not feel the jerk of the handle, then the operator may allow the mandrel retraction continue until the piston 205 of cylinder 202 bottom-out, the pressure in chamber A of cylinder 202 quickly reaches the limit pressure of power unit 207, which is set by pressure relief valve 209. Pressure switch 218, being preset to turn-on at a pressure slightly lower than the limit pressure of power unit 207, will turn on LED light (not shown in FIG. 2) to alarm the operator to stop mandrel retraction.

If mandrel retraction is stopped after LED light is turned on, the highly pressurized hydraulic fluid will be trapped in chamber A of cylinder 202 because logic device 214 and fluid controller 215 remain closed. To release the high pressure, momentarily advance the mandrel 100 via supplying pressurized hydraulic fluid to chamber B of cylinder 202 for a few seconds to build up oil pressure in chamber B of cylinder 202 in order to provide enough pilot pressure for opening pilot-to-open check valve 217, operator will be signaled, e.g., by a light (LED light going off) or will hear a "pop" sound from the pilot-to-open check valve 217, when the pilot-to-open check valve 217 is opened to allow hydraulic fluid in chamber A of cylinder 202 directly flow into tank 208. Pilot-to-open check valve 217 is located across flow paths to chambers A and B of cylinder 202, and may be known as cross-port. The pilot ratio of pilot-to-open check valve 217 is usually 3:1, meaning that one third of the pressure in chamber A of cylinder 202, or one third of the limit pressure of power unit 207 for this application, is needed in chamber B of cylinder 202 to open the valve to tank 208. When the high pressure in chamber A of cylinder 202 is reduced to below the re-open pressure characteristic to logic device 214, the device will also open to allow hydraulic fluid (e.g., oil) to return to the tank 208.

In preparation to coldwork next workpiece aperture, the mandrel 100 is quickly advanced to a start position at high speed of power unit 207. When the solenoid of power unit 207 is energized for "advance", port A of power unit 207 is open to tank 208, thus allowing hydraulic fluid in chamber A of cylinder 202 return to tank 208.

Figure 3:
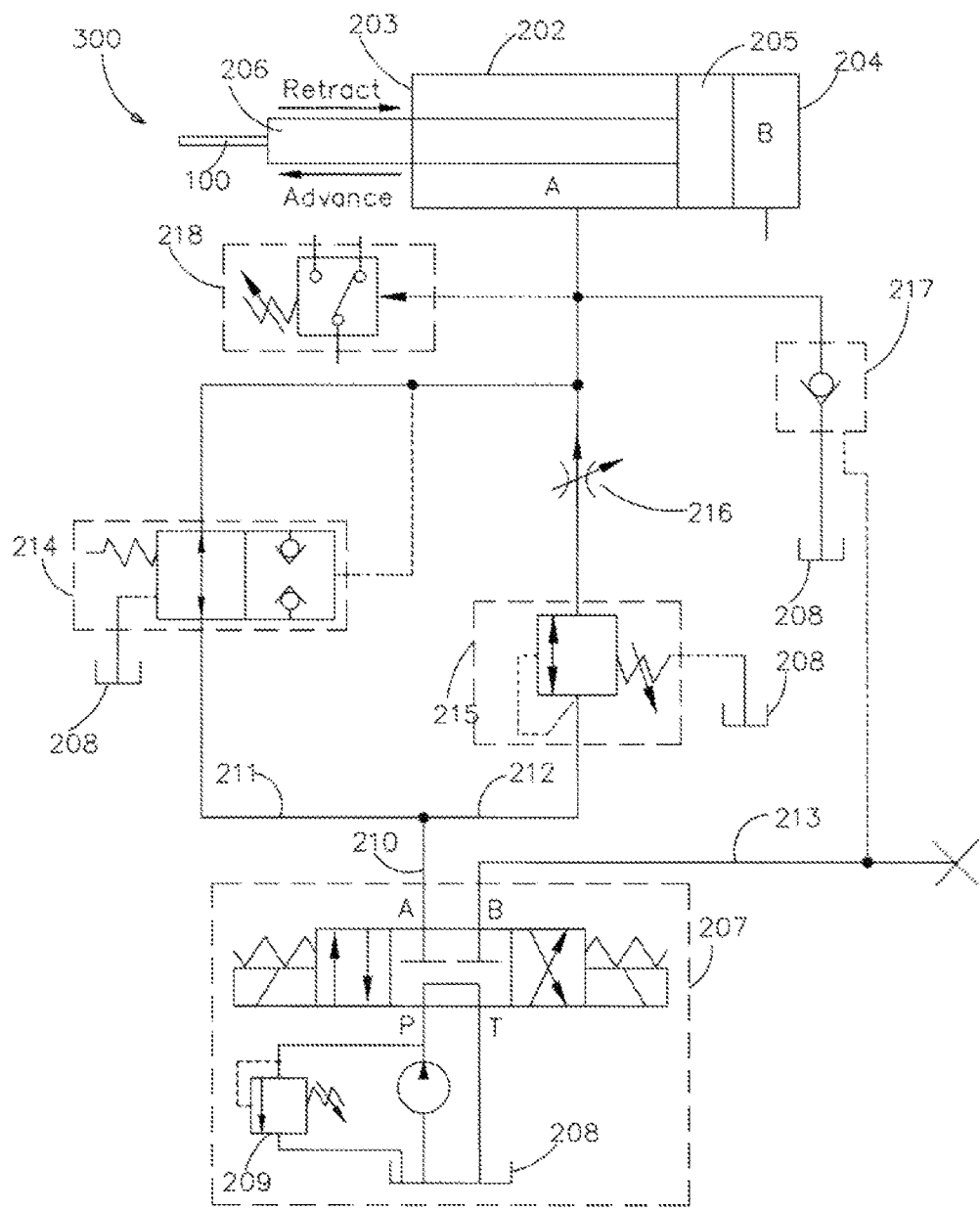
FIG. 3 is a schematic view of a system for coldworking a workpiece according to an example embodiment.

To coldwork apertures in workpieces with the seamless SMA sleeve method, a certain amount of force is required to advance the mandrel through the sleeve; thus, it requires a double action cylinder. In the split sleeve or split mandrel of the prior art methods, the force required to advance the mandrel is none or insignificant; thus, single action cylinder would suffice the purpose although double-action may be applicable as well. As shown in FIG. 3, the principle to enable sufficiently low speed of mandrel retraction can also be embodied to design a hydraulic system 300 for single action cylinder used for coldworking through some modifications to the hydraulic system 200 given in the above description and shown in FIG. 2. Due to the similarity between FIG. 2 and FIG. 3, the function of each hydraulic part and the flow paths would be easily understood in reference to FIG. 2 without further detailed explanation. The principal difference between the FIG. 3 embodiment of a single action cylinder is the power of chamber A, while chamber B is not powered and not part of a hydraulic circuit.

Figure 4:
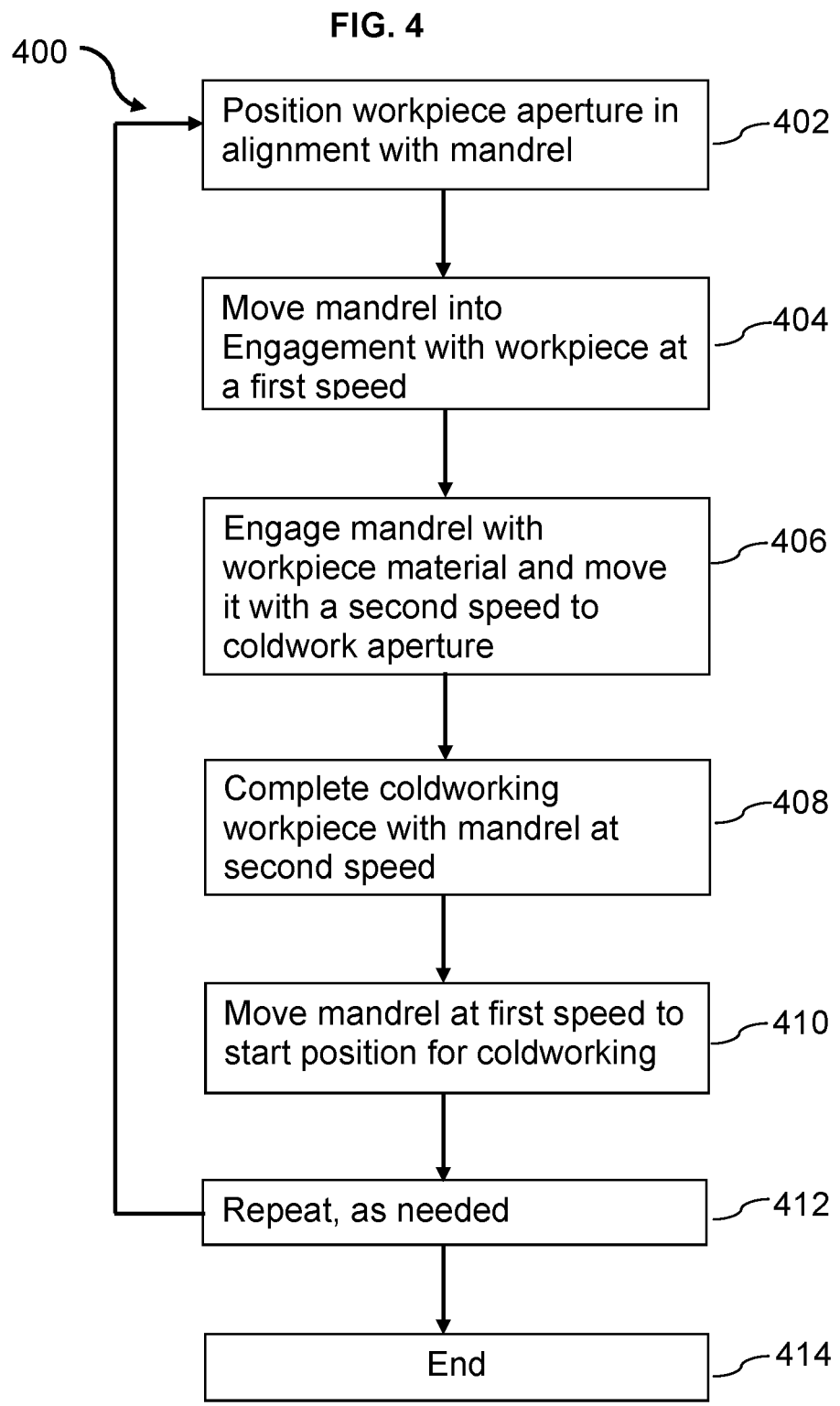
FIG. 4 shows a flow chart for a method of coldworking a workpiece according to an example embodiment.

FIG. 4 shows a process flow chart 400 for coldworking a workpiece. At 402, a workpiece aperture is positioned in alignment with a coldworking tool, e.g., a split mandrel, a split sleeve engaging mandrel, or a shape memory alloy sleeve that is engaged by a mandrel. In an example, the mandrel and the workpiece aperture are axially aligned, or co-axial.

Step 402 assumes that the aperture start hole is already in the workpiece. However, that may not be the case. The process 400 may further include drilling a start hole, which may be significantly smaller than the aperture. The drilled start hole may be reamed using a reamer to a correct start size for the aperture. Optionally, the reamed aperture may be tested for proper size with a plug gage. As the plug gage may be used to check thousands of apertures, the plug gage may be checked for its proper size using a mandrel wear gage (e.g., ring gage) that slips on the plug gage.

At 404, the mandrel is moved into engagement with the workpiece aperture. In the case of a split mandrel only the mandrel is in engagement with the workpiece material defining the aperture. If a sleeve, either a split sleeve or a seamless shape memory alloy sleeve, is used, then the sleeve is inserted into the aperture with the mandrel. Step 404 can be performed at a fast, first speed to assist in an efficient throughput of workpieces through the process 400.

At 406, the mandrel is engaged with the workpiece material at a slower, second speed, that is slower than conventional methods and slower than the first speed in some embodiments. In an example, when the workpiece is an aerospace grade aluminum sheet, then the second speed can be set such that the mandrel engaging the workpiece at the aperture about 35 seconds per inch or greater. The mandrel may be used at other speeds as described herein. The mandrel or the sleeve engages the material of workpiece to create radial and tangential plastic flow of material. In an example, a hydraulic press is connected to the mandrel to move the mandrel through the aperture at the second speed. The speeds may be set according to any example herein.

At 408, the coldworking of the workpiece material at the aperture is completed at the second speed or at a controlled speed to reduce axial plastic flow of material at the aperture.

At 410, after coldworking an aperture is competed at second speed which is slower than the first speed, move the mandrel at first speed to the start position in a hydraulic press in preparation to coldwork next aperture. If there are other apertures to be coldworked, proceed to 412; if not then the process stop at 410.

At 412, the process may return to 402 to coldwork other apertures. If is no more aperture to be coldworked, the process stop at 414.

Figure 5:
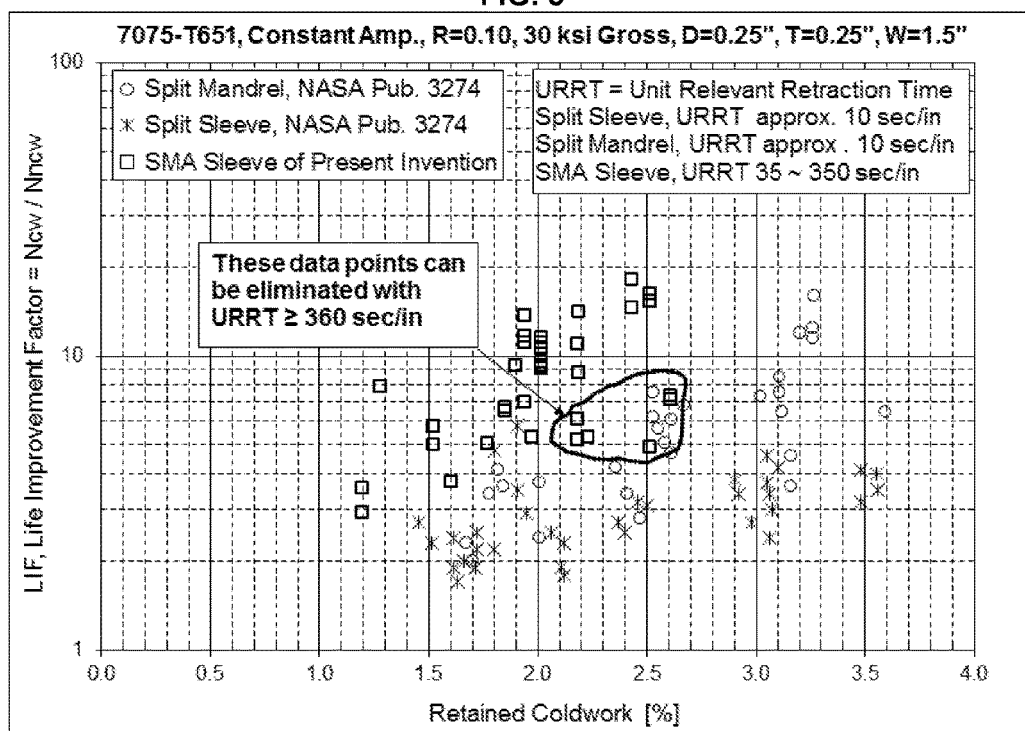
FIG. 5 shows a graph of life improvement factor versus retained expansion.
Figure 6:
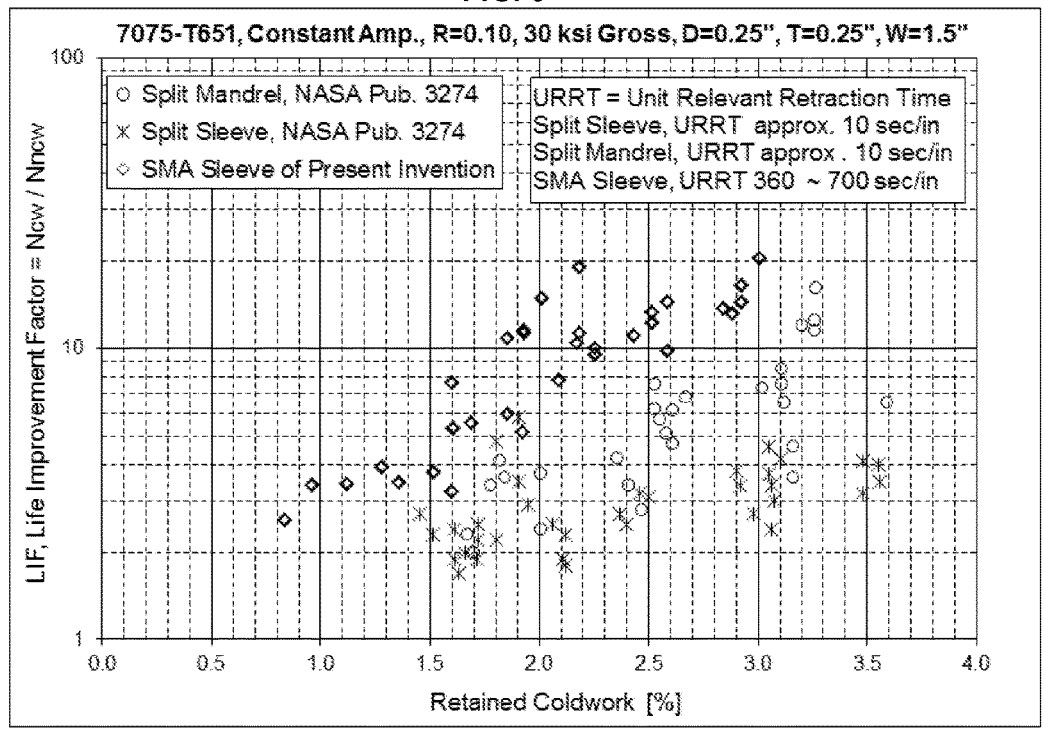
FIG. 6 shows a graph of life improvement factor versus retained expansion.

FIGS. 5 and 6 show graphs of life improvement factor ("LIF") versus retained coldwork ("RCW") for two prior art methods and the example embodiments of this invention, wherein LIF is defined as the fatigue life of coldworked hole being divided by that of non-coldworked and RCW is defined as the difference in diameters between coldworked and non-coldworked hole being divided by the diameter of non-coldworked hole. FIG. 5 shows the fatigue test results from a split mandrel test, a split sleeve test at a conventional mandrel retraction speed and shape memory alloy ("SMA") sleeve test at a controlled mandrel travel speed according to an example of the teachings herein. The high speed of mandrel retraction of the split mandrel and the split sleeve in the axial direction contributes to the shortcoming of wide data scattering in the graph of the LIF versus RCW. The unit relevant retraction time (URRT) of the FIG. 5 tests was approximately 10 seconds per inch for the split sleeve and split mandrel methods whereas 35~350 second per inch for the SMA sleeve of the present invention. The LIF for the SMA sleeve method of present invention is substantially higher than those for the split sleeve and split mandrel methods. There are some outliers at high RCW for the SMA sleeve method; the outliers are still on the upper bound of the LIF for the split mandrel method. The outliers for the SMA method of present invention can be eliminated with even slower mandrel retraction speed.

FIG. 6 shows the fatigue test results of the split mandrel test of FIG. 5, a split sleeve test of FIG. 5 and a shape memory alloy sleeve test at a slower mandrel travel speed according to the teachings of the present disclosure. In FIG. 6, the URRT of the SMA sleeve method of present disclosure can be greater than 350 seconds per inch or in a range of 360~700 seconds per inch. FIG. 6 shows that the LIF for SMA sleeve method of present disclosure has no outliers and is substantially higher throughout the entire RCW than those for the split sleeve and split mandrel methods. The current design practice adopts a LIF somewhere around 3.0. Thus an URRT of 35 second per inch or greater would suffice this result. However, the URRT at 350 seconds per inch or greater is especially useful to the design situations where the workpiece is subjected to high stress. Therefore it needs high RCW in order to attain high LIF, e.g., 5.0 or greater for meeting design service life requirement, e.g., in the aircraft industry. As indicated in FIGS. 5 and 6, the new present method of coldworking holes as described herein disclosure utilizes a sufficiently slow mandrel retraction axial speed to alleviate or reduce shortcoming(s) of the conventional methods. Here, "sufficiently slow" shall be slow enough to promote radial and tangential plastic flow thereby improving the effectiveness of coldworking operation, yet not too low to prolong the time duration of coldworking operation. In the prior art methods, the total retraction time is generally approximately around or less than a few seconds, for example three seconds or less, regardless the total distance traveled by the mandrel from the start to the end of the step of mandrel retraction. This would translate into a relevant retraction time of approximately 10 second per inch of coldworked hole thickness or less. Relevant retraction time is affected by the amount of coldworking interference level, mandrel taper length of its major diameter portion, stack-up thickness of the workpiece, hole diameter, and the friction between mandrel and sleeve for the art methods employing a sleeve or between mandrel and aperture bore for the art methods without a sleeve, and the force required to expand a sleeve for the art methods employing a seamless sleeve. In the present disclosure, "sufficiently slow" relevant retraction speed is such that the unit relevant retraction time to be longer than 10 second per inch of coldworked hole thickness, e.g., greater than 15 seconds per inch, and preferably 35 second per inch of coldworked hole thickness or greater; and more preferably longer than 350 seconds per inch of coldworked hole thickness for the cases where exceptionally high LIF is desired. At unit relevant retraction time of 35 seconds per inch of coldworked hole thickness or greater, the test results of FIG. 5 shows higher LIF and less data scattering than those from the unit relevant retraction time used by the prior art methods. At unit relevant retraction time of 350 second per inch of coldworked hole thickness or greater, the test result of FIG. 6 shows not only higher LIF and but also substantially less data scattering than those from the unit relevant retraction time of 35 seconds per inch of coldworked hole thickness as shown in FIG. 5.

The test results are for the holes coldworked with methods similar to those seamless SMA sleeve methods as described in U.S. Pat. Nos. 5,943,898 and 6,266,991, in which I am the inventor and which are hereby incorporated by reference for any purpose. However, if the disclosures of these two patents conflict with the present disclosure, the present disclosure controls. Based on the forgoing discussion on the principle to improve the effectiveness of coldworking operation, the split sleeve and split mandrel methods are expected to show similar test results if the unit relevant retraction times were realized during coldworking operation. When relevant retraction speed is sufficiently slow, its variation during the relevant retraction period will have little effect, if any, on the promotion of radial and tangential plastic flow.

It is noted that it may be costly to maintain a constant mandrel speed at every instant during the aforementioned relevant retraction period. Accordingly, the mandrel retraction speeds may be calculated as the maximum retraction speed during a coldworking operation or may be the average speed of a mandrel during the coldworking operation.

The aforementioned effectiveness of the sufficiently low mandrel retraction axial speed to improve LIF and reduce data scattering is a manifestation of the higher beneficial compressive residual stress created by present invention than those created by all the prior art methods. Said residual stress can be nondestructively measured with x-ray diffraction method which is commercially available. X-ray diffraction method will be able to discern whether a group of holes under production environment are coldworked at sufficiently low mandrel retraction axial speed or coldworked at conventional mandrel retraction axial speed by comparing the magnitude and distribution of the beneficial compressive residual stresses.

FIG. 6 indicates that LIF of SMA sleeve method is approximately 4 and 18 at RCW of 1.5% and 3.0%, respectively. As an example, for the holes of nominal diameter of 0.2500 inch, the RCW is typically 1.5% to 3.0% for a conventional tolerance of 0.003 (+/−0.0015) inch on the diameter of start hole for coldworking. High coldworking interference level results in high RCW, where coldworking interference level is defined as the difference, between the sum of mandrel major diameter and two times the sleeve thickness minus the diameter of the start hole, being divided by the diameter of the start hole. For the same mandrel size and sleeve thickness, large start hole within the tolerance range gives low coldworking interference level therefore low RCW. To deal with the effect of RCW on the LIF due to the tolerance, an approach is to make commensurate increase in mandrel major diameter so as to compensate for the larger start hole in order to attain approximately same coldworking interference level therefore approximately same RCW and therefore approximately same LIF. Such an approach to maintain approximately high LIF is especially amicable to be implemented in an automated coldworking system.

While the present disclosure emphasized mandrel based systems and techniques, the present disclosure is not so limited. Other devices that coldwork metals to expand apertures therein using dual travel speeds are within the scope of the present disclosure. The mandrel may operate with a sleeve. The principles of present invention given in the foregoing description are applicable to the use of sleeves in coldworking workpieces. Moreover, the present methods and system may be practices with a solid mandrel, split mandrel, or rotating mandrel, which can each be used either with or without a split sleeve or seamless sleeve.

As discovered by the present inventor upon examination of the fracture surfaces of fatigue test specimens which are coldworked with some prior art methods employing a mandrel revealed clues to alleviate the shortcoming of such methods. The inventor's examination shows that: 1) cracks may originate at the mandrel-entrance side of hole bore (where the mandrel-entrance side refers to the side of hole bore at which mandrel first engages with hole bore during mandrel retraction through and out of a hole); 2) the protrusion (e.g., an upsetting) of material around a hole due to coldworking is larger on the mandrel-exit side of the hole than that on the entrance side (where mandrel-exit side of the hole refers to the side of hole bore at which mandrel lastly engages with hole bore during mandrel retraction through and out of a hole). Although some of the practitioners of the prior art methods may have also observed the phenomena, they do not know yet until present disclosure the effect of the phenomena on the effectiveness of coldworking operation. The present inventor has discovered the effect a sufficiently low mandrel retraction axial speed on influencing the shape of the coldworked metal and its resulting effectiveness. Cracks may originate at entrance side indicates that the beneficial compressive stress at the mandrel-entrance side is lesser than that at the exit side. Also, the protrusion of material at the mandrel-exit side is larger than that of mandrel-entrance side indicates that mandrel retraction axial speed induces plastic flow in axial direction from mandrel-entrance side to exit side during mandrel retraction. Such axial plastic flow of the material reduces the amount of material for plastic flow in non-axial (radial and tangential) direction, which is the primary contributor to the creation of the beneficial compressive residual stress. Axial plastic flow is inevitable for those methods employing a mandrel which always has an axial speed during mandrel retraction. Axial plastic flow increases with increasing mandrel retraction axial speed. The practitioners of the prior art methods do not know the adverse effect of high mandrel retraction axial speed, some of them even promote high mandrel retraction axial speed to shorten the coldworking operation time thereby increasing the manufacturing efficiency. However, as I discovered such speed of coldworking degrades the effectiveness of coldworking operation. Thus, I invented an improved method that improves the effectiveness of coldworking operation by controlling (e.g., reducing) the mandrel retraction axial speed to a range which is not too low to prolong coldworking operation time duration yet low enough to promote radial and tangential plastic flow in order to improve the effectiveness of the coldworking operation.

A method for coldworking holes using sufficiently low mandrel retraction speed and a hydraulic system to enable said sufficiently low mandrel retraction speed is described herein. When a mandrel, with or without a sleeve, passes through and out of an aperture in an associated workpiece, it expands the hole beyond yield strength of material of the workpiece and therefore imparts beneficial compressive residual stress to enhance fatigue life of the aperture. The use of a sufficiently low mandrel retraction speed is to reduce plastic flow in the axial direction and promote plastic flow of workpiece material in the non-axial (radial and tangential) direction of the aperture, thereby improving the effectiveness of coldworking apertures. Coldworking material adjacent an aperture may employ a mandrel. The motive system (e.g., a hydraulic system or electrical system) may employ a two speed power unit and valves (fluid flow control or electric signal) to provide a high speed and low speed for mandrel movement (e.g., retraction) when the mandrel moves into position to contact the workpiece and when in contact with the workpiece. The low speed is selected to be sufficiently low to promote the non-axial plastic flow of material and retard the axial plastic flow of material away from the bore of the aperture.

Figure 7:
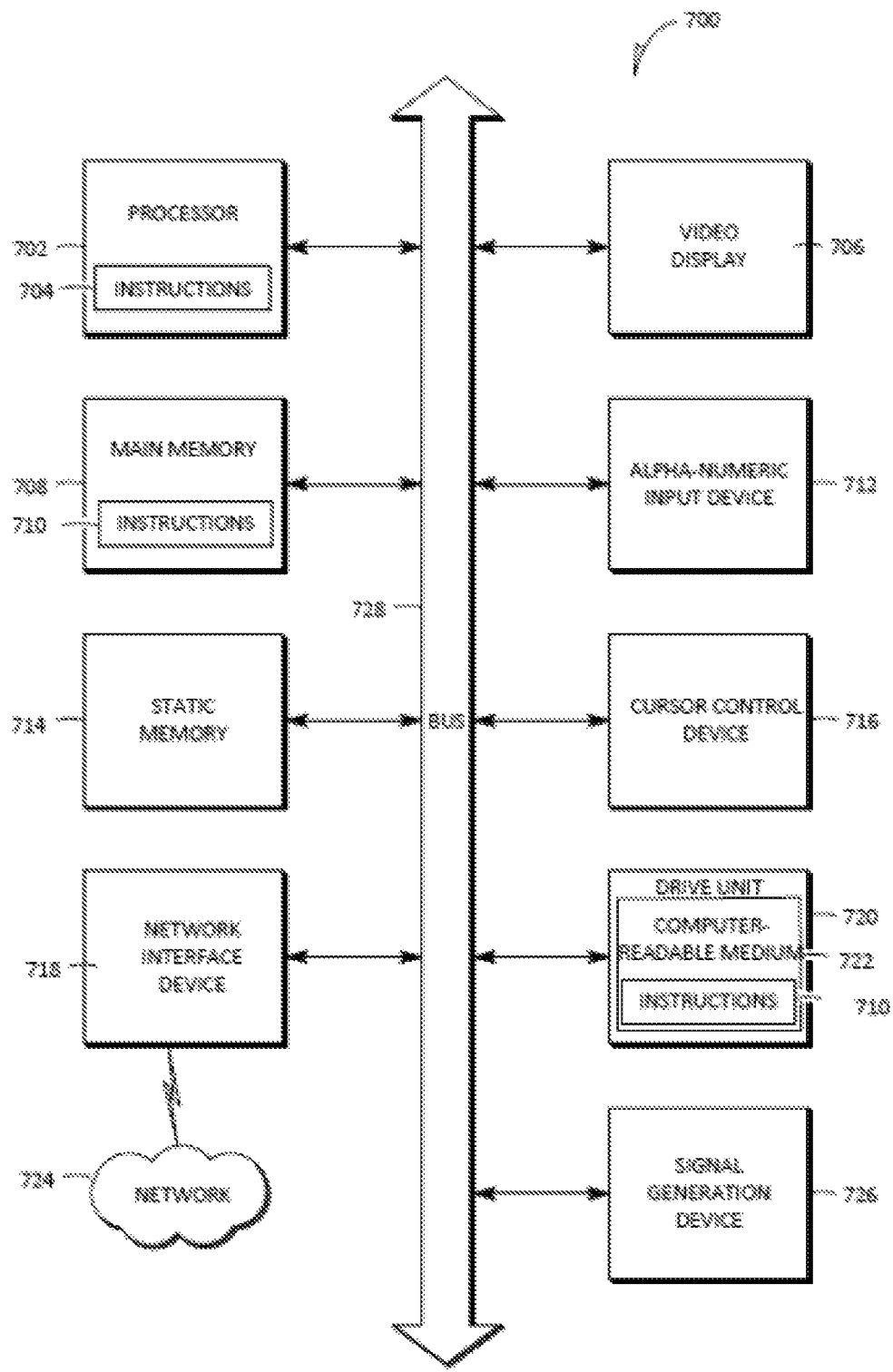
FIG. 7 shows a machine for controlling the coldworking operations as described herein.

FIG. 7 shows a block diagram of a machine in the example form of a computer system 700 within which a set of instructions may be executed causing the machine to perform any one or more of the methods, processes, operations, or methodologies discussed herein. The computer system 700 can control the speeds of a hydraulic system or an electric system moving a mandrel 106, e.g., inserting a mandrel, moving a mandrel through an aperture at a controlled speed, setting the various pressure thresholds for hydraulic controls, setting control signals for electric motor and the like.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions sequential or otherwise) that specifies actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 708 and a static memory 714, which communicate with each other via a bus 728. The computer system 700 further includes a video display unit 706 (e.g., a liquid crystal display (LCD) or a cathode ray tube (CRT)). The computer system 700 also includes an alphanumeric input device 712 (e.g., a keyboard), a cursor control device 716 (e.g., a mouse), a drive unit 720, a signal generation device 726 (e.g., a speaker) and a network interface device 724.

The drive unit 720 includes a computer-readable medium 722 on which is stored one or more sets of instructions (e.g., software 710) embodying any one or more of the methodologies or functions described herein. The software 710 may also reside, completely or at least partially, within the main memory 708 and/or within the processor 702 during execution thereof by the computer system 700, the main memory 708 and the processor 702 also constituting computer-readable media.

The software 710 may further be transmitted or received over a network 724 via the network interface device 718.

While the computer-readable medium 722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium. The computer-readable media may store instructions for controlling systems 200, 300 or the tool 100. In an example embodiment, the instructions store different speeds for individual workpieces 101 and for individual tools 100. These speeds can be selected via an input to the computer system 700 and transmitted from the computer system 700 to the systems 200, 300 or controller for the tool 100 via a wired network or a wireless network, e.g., from the network interface device 720 or over the bus 708. If the tool 100 includes a rotating mandrel, then the rotational speed may also be stored in the computer system 700 to control the rotational speed of the mandrel.

Figure 8A:
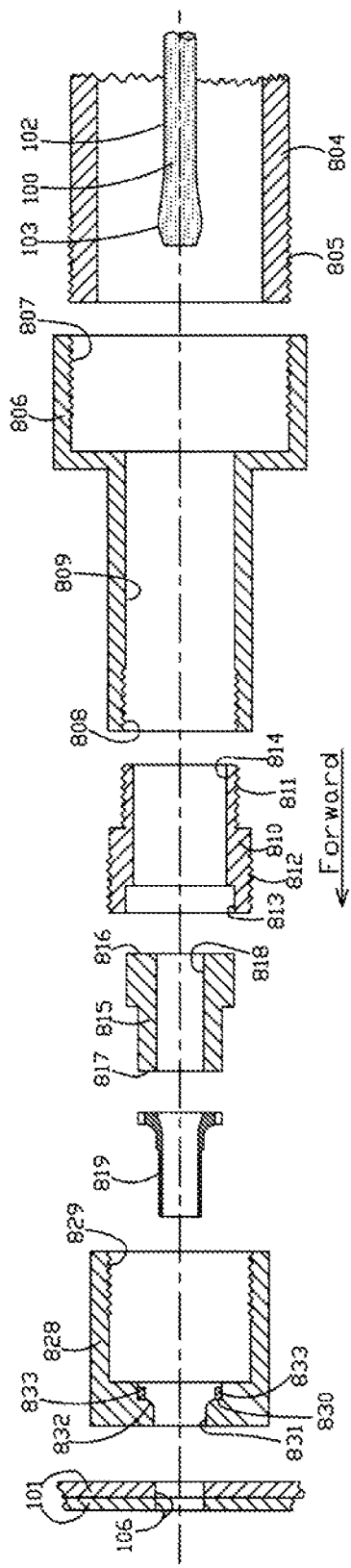
FIG. 8A shows a cross-sectional view of the parts of a tool according to an example embodiment.
Figures 8B, 8C:
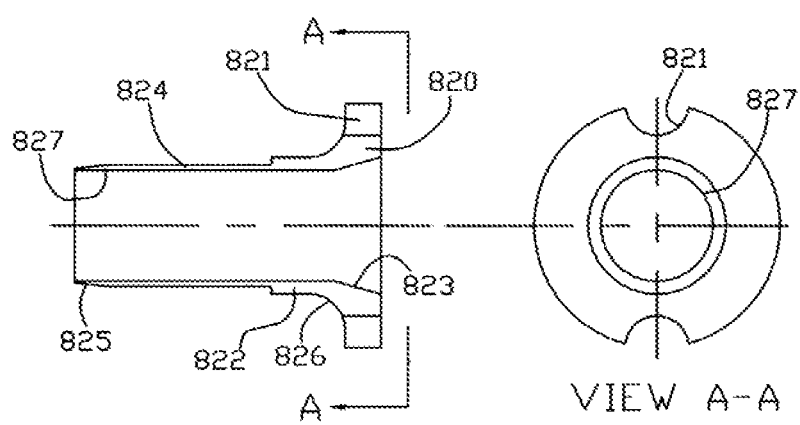
FIG. 8B shows an enlarged cross-sectional view of the sleeve of FIG. 8A.
FIG. 8C shows an elevational end view of the sleeve of FIG. 8A.

FIGS. 8A-8C show a tool 100 for coldworking a workpiece including a portion of the cylinder of a mandrel pulling device 804 (e.g., a hydraulic press or the like) having a mandrel 100 coaxially aligned with a workpiece 101 having an aperture 106. Placed between the workpiece 106 and the cylinder of a mandrel pulling device 804 are an extension-tube 806, an adapter 810, a spacer 815, a pre-lubricated tubular seamless SMA sleeve 819, and an end-cap 828 to serve as sleeve holding device. The cylinder of a mandrel pulling device 804 has a screw-threaded front end 805. The mandrel 100 has a major diameter portion 103 and a minor diameter portion 102. The extension-tube 806, serving the purpose to reach holes to be coldworked, has a screw-threaded front end 808, a screw-threaded rear end 807, and a central circular passageway 809. The adapter 810 has a screw-threaded front end 812, a screw-threaded rear end 811, a counter-bore 813 at the front end to seat the spacer 815, and a central circular passageway 814. The spacer 815 has a circular central passageway 818, a rear portion 816 seating in the counter bore 813 of the adapter 810, a front portion 817 which is in contact with the flange 820 of the SMA sleeve 819, thereby restraining the axial motion of the sleeve 819. The tubular seamless SMA sleeve 819 is made of shape memory alloys having a superelasticity property and does not have a seam or slot in the tubular portion. The sleeve 819 comprises a flange 820, tubular portions 822 and 824, a fillet radius 826 joining the flange 820 and tubular portion 822. At least two semi-circular notches 821 are located at diametrically opposite sides of the flange 820. The sleeve 819 further includes a central circular passageway 827. When assembled, the tubular portion 822 of the sleeve 819 is enclosed within end-cap 828, is not in contact with the workpiece 101 during coldworking operation as the tubular portion 819 is prone to collapsing and being damaged during coldworking operation. Therefore it is made thicker than the tubular portion 824 which is in contact with the workpiece 101. To ease the entrance of the major diameter portion 103 of the mandrel 100 during coldworking operation, the diameter of the entrance opening 823 at the sleeve flange 820 is made larger than the inside diameter of the tubular portions 822 and 824. The outside diameter of the forward end of the tubular portion 825 of the sleeve 819 is made slightly smaller than the rest of the tubular portion to ease the insertion of the sleeve 819 into the aperture 106 of the workpiece 101. The required recoverable elastic strain for a SMA is determined by the desired coldworking interference level. Any SMA that has a critical recoverable elastic strain in excess of the required value can be used to make the seamless sleeve for use at the unit relevant retraction speed or URRT as described herein. The Nitinol and Cu—Zn families of SMA possess such a superelastic property. Currently, the Nitinol family of shape memory alloys is used in various examples because these shape memory alloys have a sufficient critical recoverable strain and are technologically well-developed. However, the present disclosure is not limited to these specific families of SMA and other SMA may be used for making the seamless sleeves. The end-cap 828 has a screw-threaded rear end 829, a counter-bore 830 for the sleeve 819 to seat on, a central circular passageway 831, a fillet radius 832 joining the central circular passageway 831 and the counter-bore 830. The counter-bore 830 has two protruding cylindrical surfaces 833 located at two diametrically opposite sides, which match the two semi-circular notches 821 on the sleeve 819, thereby restraining the sleeve 819 from rotational motion.

Various example embodiments describe using a shape memory alloy sleeve. In an example, such a sleeve may be used with a rotational mandrel for coldworking apertures. The apparatus may use a tubular seamless sleeve made of shape memory alloys having a superelasticity property, a mandrel having major and minor diameter portions, and an end-cap to seat and restrain axial and rotational motion of said sleeve. An example coldworking operation may include the steps of placing the sleeve firmly between the end-cap and an adapting-spacer which are carried on a mandrel pulling device, passing forward the major diameter portion of the mandrel through the sleeve whose diameter is therefore elastically expanded and thereafter shrinks, inserting the sleeve together with the mandrel into said workpiece aperture, placing the end-cap against the workpiece, retracting while rotating the mandrel backward through and out of the sleeve. This will thereby expand the sleeve wall against the workpiece wall about the bore while exerting radial outward force on the sleeve which in turn transmits the coldworking force to the workpiece material at the aperture and plastically expand the aperture. Thereafter the sleeve diameter shrinks to a smaller size to ease the removal of the sleeve out of the aperture. The sleeve is reusable due to the superelasticity property of shape memory alloys.

In an example embodiment, a method to coldwork apertures utilizing a mandrel, with or without a sleeve, which expands an aperture in an associated workpiece beyond yield strength of material of the workpiece while passing through and out of the aperture at sufficiently low mandrel retraction axial speed in order to reduce plastically yielded flow of material moving along axial direction of the aperture (e.g., direction of travel of the mandrel) and therefore promote plastically yielded flow of material moving in non-axial (radial and tangential) direction of the aperture (e.g., essentially perpendicular to the direction of travel of mandrel), thereby enhancing the effectiveness of coldworking operation for improving fatigue life. Such a method may include engaging the mandrel with the aperture bore at sufficiently low axial speed resulting in an unit relevant retraction time from the moment at which the workpiece material is engaged to the moment at which the mandrel disengages with aperture bore in more than 10 second per inch of the thickness of workpiece at the aperture, preferably in more than 15 seconds per inch, 35 seconds per inch, 60 second per inch, 350 seconds per inch, or 500 seconds per inch of the thickness of the workpiece at the aperture.

In an example, the systems and methods of coldworking workpieces with aperture as described herein may use at least two speeds of mandrel retraction. The speeds may include a high speed mandrel retraction to quickly retract the mandrel to a position to engage with the aperture bore to be ready for expanding the aperture at a second, low speed, and to quickly advance, after finishing coldworking operation for the aperture, the mandrel to a position for coldworking next aperture. The mandrel speed may further include a sufficiently low speed resulting in an unit relevant retraction time from the moment at which the mandrel engages with aperture bore to the moment at which mandrel disengages from with the aperture bore in more than 10 second per inch of the thickness of the workpiece at the aperture, e.g., preferably in more than 15 seconds per inch, 35 seconds per inch, 60 seconds per inch, 350 seconds per inch, or 500 second per inch of the thickness of the workpiece at the aperture.

A method of coldworking apertures holes as described herein may use a sleeve and the sleeve may be a seamless sleeve made of a shape memory alloy having a superelasticity property or a split sleeve.

A method of coldworking apertures as described herein may include a rotating mandrel or a split mandrel. In an example, a rotating mandrel may be provided with a means to restrain the sleeve from rotating together with the rotating mandrel. The rotating motion of the mandrel is conductive to decreasing the friction at the contact surface between the mandrel and the sleeve, thereby reducing the axial force; and is conductive to ease the axial motion which encounters a resistance due to the nature of metal flow in the workpiece during coldworking operation, thereby reducing the axial force. Additionally, when the rotating motion of the mandrel is coupled with the sufficiently slow axial motion of the mandrel, said effects for rotating motion of the mandrel may augment the effect of sufficiently slow axial motion in improving the effectiveness of coldworking operation.

A hydraulic system may be used to enable sufficiently low mandrel retraction axial speed for coldworking operation. The mandrel may be attached to the piston rod of a hydraulic cylinder in the hydraulic system. The hydraulic system may include a means to reduce the flow rate of the pressurized hydraulic fluid coming out of the hydraulic power unit (e.g., a pump); a means to close a flow path at preset pilot pressure and a means, in combination, to open another flow path at preset pressure in said another flow path to provide a two speed hydraulic system to axially move the mandrel.

In an example embodiment of a hydraulic system, the means to reduce flow rate is pressure compensated to maintain constant flow rate for the varying pressure during mandrel retraction.

In an example embodiment of a hydraulic system, the means, such as pilot-to-open check valve, is located cross-port to drain highly pressured oil in the cylinder when piston bottom-out occurred after the step of mandrel retraction of coldworking operation.

Workpiece, as used herein, refers to articles that may be coldworked, e.g., metals. In an example embodiment, the workpieces may be a sheet of metal or an airframe part in which a plurality of holes or apertures is to be formed. It is desirable to coldwork the apertures to their final dimensions to reduce the risk of metal fatigue and extend the life of the aperture. In an example, the sheet or airframe part may be aircraft grade aluminum, titanium alloy, high strength steel or the like. In an example, the workpiece may be a stack-up consisting of different metals and composite materials. In some uses, a plurality of apertures is made in a metal sheet to provide attachment points to affix the metal sheet to the aircraft frame. Other workpieces, which may be sheets or other shapes, may be coldworked according to the methods described herein. Components that may be coldworked using the present disclosure include, but are not limited to, an aircraft skin, stiffeners, formers, bulkheads, other aircraft components, or other structures where a coldworking may be used to strengthen the fatigue strength of holes. Other vehicle (e.g., motorcycle, automobile, truck, tractor, rocket, satellite, railway and the like) components may be coldworked using the techniques described herein to enhance the fatigue strength.

Various example embodiments described herein use a shape memory sleeve. A shape memory sleeve can include a tubular seamless sleeve made of shape memory alloys (SMA) and that has a superelasticity property. The superelasticity property of the SMA is described in C. M. Wayman's article entitled "Shape Memory Alloys" which was published in Materials Research Society Bulletin, Volume 18, Number 4, April 1993. Shape memory alloys are characterized by two effects, namely the shape memory effect and the superelasticity effect. U.S. Pat. No. 4,433,567 utilized the shape memory effect, which requires a substantial change of the temperature of a sleeve during the hole coldworking operation. U.S. Pat. Nos. 5,943,898 and 6,266,991 B1 describe the superelasticity effect, which is effective at ambient temperatures of manufacturing shops during the coldworking operation and does not require an intentional change of temperature in the environment or at the sleeve/workpiece. To demonstrate how tubular seamless SMA sleeves can be made to prolong reusability, an underlying concept of using SMA sleeves is explained with the following example to coldwork a nominal 0.25 inch diameter hole using a tubular seamless SMA sleeve. All dimensions below are in the unit of inches. This example uses a typical coldworking interference level of 0.011 inch in diameter, which is 4.4% of the hole diameter. The approximate hoop strain of the sleeve is 6.4%. For the SMA sleeve to be reusable, said strain must be repeatedly recoverable. For the Nitinol and Cu—Zn families of SMA, the critical (maximum) recoverable strain is 7% to 10%, which is greater than the required 6.4% and is repeatable.

Pre-coldwork hole diameter: 0.2430
Selected coldworking interference level: 0.0110
Expanded hole diameter with sleeve and mandrel in the hole: 0.2430+0.0110=0.2540
Selected wall thickness of sleeve: 0.0100
Mandrel major diameter: 0.2540−(2×0.010)=0.2340
Selected sleeve outside diameter, which is preferably smaller than pre-coldwork hole diameter: 0.2400 (<0.2430)
Sleeve inside diameter: 0.2400−(2×0.010)=0.2200
Sleeve hoop strain: (0.2340−0.2200)/0.2200=6.4%

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may be implemented as hardware circuitry, optical components, single or multi-processor circuits, memory circuits, software program modules and objects, firmware, and combinations thereof, as appropriate for particular implementations of various embodiments. Such devices may control a machine to implement various processes associated the present disclosure.

The processes, methods, or algorithms disclosed herein can be deliverable to be implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, FLASH devices, MRAM devices and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components. Any of these devices may be capable of performing the methods described herein for coldworking a workpiece or controlling the systems 200, 300.

The present disclosure describes pulling or retracting a mandrel through a bore of an aperture to engage the workpiece material and force a plastic flow of material during the retraction. It will be understood that the systems and methods described herein may also work in other embodiments when pushing or advancing (forwarding) the mandrel into the bore of the aperture to engage the workpiece material and force plastic flow of the material. The speed of the mandrel while engaging the material, e.g., metal, of the workpiece may be controlled according to the teachings herein in either the retraction or in the forward motion of the mandrel.

The present disclosure describes various embodiment that minimize the plastic flow of workpiece material in the direction of travel of a tool (e.g., a mandrel) in the direction of movement of the tool during coldworking an aperture. This will work to minimize the flow of material out of plane of the workpiece. This may provide the benefits as described herein to a greater extent or a lesser extent depending on the workpiece (and resulting use of the workpiece) and the tool being used to coldwork the workpiece. In examples described herein the term aperture and the term holes, and words of similar import, may refer to the absence of material in a workpiece. The apertures and holes may be circular in shape and bound by material of the workpiece. Coldworking the aperture refers to engaging the material closely adjacent the aperture and may produce a plastic flow of the material adjacent the aperture.

In examples described herein the term aperture and the term holes, and words of similar import, may refer to the absence of material in a workpiece. The apertures and holes may be circular in shape and bound by material of the workpiece. Coldworking the aperture refers to engaging the material closely adjacent the aperture and may produce a plastic flow of the material adjacent the aperture.

An example embodiment, is directed to a method to maintain approximately a same coldworking interference level by compensating for the diameter variation of coldworking start hole due to a manufacturing tolerance of hole diameter. The method may comprise selecting a wall thickness for the sleeve to be used for start aperture diameters within the manufacturing tolerance; measuring diameter of start aperture; and determining a mandrel major diameter to maintain approximately a same coldworking interference level for the measured diameter of said start aperture and the selected wall thickness of the sleeve.

An example embodiment of the method may comprise the determining step including determining using a processor with the measured diameter of the start aperture and the selected wall thickness of the sleeve as inputs to the processor.

An example embodiment of the method may comprise the processor being incorporated into a computer system to control steps of coldworking holes including drill undersized pilot hole, reaming pilot hole to specified coldworking start hole size, inspecting start hole size, selecting mandrel of required size to maintain approximately constant coldworking interference level, inspect size of selected mandrel, performing coldworking operation, inspect size of coldworked hole, reaming coldworked hole to specified size.

An example embodiment of any of the methods described herein includes the metal workpiece is made of a metal sheet or is an airframe part.

Although exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

Although various embodiments may have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for coldworking an aperture in a metal workpiece at ambient temperatures of manufacturing shops to enhance fatigue life, comprising:
    moving a mandrel to a position to engage an aperture at a planar surface of the metal workpiece for coldworking;
    retracting the mandrel through the aperture to coldwork the metal workpiece at the aperture; and
    upon the mandrel engaging the metal workpiece to coldwork an area of the metal workpiece at the aperture at an ambient temperature, retracting the mandrel at a speed such that a time duration for the mandrel engaging the metal workpiece at the aperture to coldwork the aperture is slower than 10 seconds per inch and as slow as 700 seconds per inch through a thickness of the metal workpiece at the aperture.

2. The method of claim 1, wherein moving the mandrel to the position to engage the aperture is further comprised of moving at least one of a split mandrel and a solid mandrel with a sleeve to the position, and wherein at least one of the split mandrel and the solid mandrel with the sleeve is retracted through the aperture to coldwork the metal workpiece.

3. The method of claim 1, wherein retracting the mandrel through the aperture to coldwork the metal workpiece produces an axial flow of material proximate to the aperture at a mandrel-entrance side of the metal workpiece and at a mandrel-exit side of the metal workpiece, wherein the axial flow of material in the metal workpiece produces a mandrel-entrance side protrusion and a mandrel-exit side protrusion, and wherein the mandrel-entrance side protrusion and the mandrel-exit side protrusion are approximately equal in size.

4. The method of claim 3, wherein retracting the mandrel through the aperture to coldwork the metal workpiece is further comprised of retracting the mandrel at a speed to promote radial and tangential plastic flow of the metal and retard axial plastic flow of the metal at the aperture out of a plane of a surface of the workpiece, and wherein the metal workpiece is an aluminum alloy workpiece or a titanium alloy workpiece.

5. The method of claim 1, wherein retracting the mandrel at a speed such that the time duration for the mandrel engaging the metal workpiece at the aperture to coldwork the metal workpiece at the aperture is slower than about 35 seconds per inch of the metal thickness at the aperture and as slow as 700 seconds per inch.

6. The method of claim 1, wherein retracting the mandrel at a speed such that the time duration for the mandrel engaging the metal workpiece at the aperture to coldwork the metal workpiece at the aperture is slower than about 350 seconds per inch of the metal thickness at the aperture and as slow as 700 seconds per inch.

7. The method of claim 1, wherein moving the mandrel to the position to engage the aperture includes inserting the mandrel into the aperture without coldworking the aperture during inserting; and wherein retracting the mandrel through the aperture to coldwork the metal workpiece includes retracting the mandrel initially at a first speed before the mandrel engages the metal workpiece followed by a second speed that is slower than the first speed when the mandrel engages the metal workpiece to coldwork the metal workpiece at the aperture.

8. The method of claim 1, wherein moving the mandrel to the position to engage the aperture includes inserting the mandrel with a sleeve through the aperture, where the sleeve is configured to engage the metal workpiece at the aperture, wherein the sleeve extends axially through the aperture from a mandrel-entrance side to a mandrel-exit side, and wherein the sleeve is at least one of a split sleeve and a seamless sleeve.

9. The method of claim 1, wherein retracting the mandrel includes rotating the mandrel while the mandrel or a sleeve on the mandrel is coldworking the metal workpiece.

10. A system for coldworking a material in a manufacturing shop, comprising:

a coldworking mandrel configured to engage a workpiece at an aperture thereof at an ambient temperatures of the manufacturing shop; and a motive device configured to move the mandrel into engagement with the aperture in the workpiece and configured to retract the mandrel through aperture in the workpiece at a speed such that a time duration for the mandrel engaging metal at the aperture to coldwork an area of the workpiece at the aperture is slower than at about 10 seconds per inch of workpiece thickness at the aperture thereby imparting compressive stress and retarding axial plastic flow of metal adjacent the aperture out of a plane of a surface of the metal to enhance fatigue life at the metal adjacent the aperture.

11. The system of claim 10, wherein the motive device moves the mandrel into engagement with the workpiece at a first speed and engages the mandrel to the workpiece at the aperture to coldwork the aperture at a second speed slower than the first speed.

12. The system of claim 10, wherein the motive device includes a hydraulic cylinder and a hydraulic system configured to control the hydraulic cylinder to retract the mandrel at a speed such that the time duration for the mandrel engaging the metal at the aperture to coldwork the metal workpiece at the aperture is slower than 10 seconds per inch of workpiece thickness at the aperture when the mandrel engages with a wall of the aperture.

13. The system of claim 12, wherein the motive device is further comprised of a first flow path and a second flow path for a hydraulic fluid in the hydraulic cylinder, wherein the hydraulic fluid in the first flow path moves the mandrel at a first speed and the hydraulic fluid in the second flow path moves the mandrel at a second speed resulting in the time duration for the mandrel engaging the metal at the aperture to coldwork the metal workpiece at the aperture for about 10 seconds per inch or slower, wherein the first speed is faster than the second speed with the mandrel moving in a same direction of retraction.

14. The system of claim 10, further comprising a sleeve around the mandrel and axially extending through the aperture, wherein the sleeve is configured to engage the workpiece at the aperture, and wherein the sleeve extends through the aperture from a mandrel-entrance side to a mandrel-exit side.

15. The system of claim 10, wherein the mandrel is selected from the group consisting of a solid mandrel, a split mandrel, and a rotating mandrel.

* * * * *